United States Patent
Kang (10) Patent No.: US 10,241,621 B2
(45) Date of Patent: Mar. 26, 2019

(54) DETERMINING UNINTENDED TOUCH REJECTION

(71) Applicant: Hewlett-Packard Development Company, L.P., Houston, TX (US)

(72) Inventor: Jinman Kang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 8 days.

(21) Appl. No.: 15/514,454

(22) PCT Filed: Sep. 30, 2014

(86) PCT No.: PCT/US2014/058213
§ 371 (c)(1),
(2) Date: Mar. 24, 2017

(87) PCT Pub. No.: WO2016/053277
PCT Pub. Date: Apr. 7, 2016

(65) Prior Publication Data
US 2017/0277355 A1    Sep. 28, 2017

(51) Int. Cl.
*G06F 3/042*    (2006.01)
*G06F 3/041*    (2006.01)
*G06N 99/00*    (2019.01)

(52) U.S. Cl.
CPC ............ *G06F 3/0418* (2013.01); *G06F 3/042* (2013.01); *G06F 3/0416* (2013.01); *G06N 99/005* (2013.01)

(58) Field of Classification Search
CPC ........ G06F 3/041; G06F 3/0418; G06F 3/042; G06N 99/005; G06K 9/20; G06K 9/62
See application file for complete search history.

(56) References Cited

U.S. PATENT DOCUMENTS

| 7,561,146 B1 * | 7/2009 | Hotelling .............. G06F 3/0304 345/168 |
| 7,567,240 B2 | 7/2009 | Peterson et al. |
| 7,599,561 B2 | 10/2009 | Wilson et al. |

(Continued)

FOREIGN PATENT DOCUMENTS

| TW | 528981 | 4/2003 |
| TW | 200402649 A | 2/2004 |

(Continued)

OTHER PUBLICATIONS

Schwarz, J. et al., "Probabilistic Palm Rejection Using Spatiotemporal Touch Features and Iterative Classification," ACM, 2014, 4 pages.

(Continued)

*Primary Examiner* — Joe H Cheng
(74) *Attorney, Agent, or Firm* — HP Inc. Patent Department (57) ABSTRACT

Examples relate to improving unintended touch rejection. In this manner, the examples disclosed herein enable recognizing a touch on a touch-sensitive surface, capturing a set of data related to the touch, wherein the set of data comprises a set of spatial features relating to a shape of the touch over a set of time intervals, and determining whether the recognized touch was intended based on a comparison of a first shape of the touch at a first time interval of the set of time intervals and a second shape of the touch at a second time interval of the set of time intervals.

13 Claims, 3 Drawing Sheets

(56) References Cited

U.S. PATENT DOCUMENTS

| | | | |
|---|---|---|---|
| 7,710,391 B2 | 5/2010 | Bell et al. | |
| 8,055,305 B2* | 11/2011 | Cho | G06F 1/1626 |
| | | | 345/649 |
| 8,121,640 B2 | 2/2012 | Russ et al. | |
| 8,199,117 B2 | 6/2012 | Izadi et al. | |
| 8,660,978 B2 | 2/2014 | Hinckley et al. | |
| 8,736,583 B2 | 5/2014 | Anderson et al. | |
| 9,317,156 B2* | 4/2016 | Sharma | G06F 3/0416 |
| 2005/0078092 A1 | 4/2005 | Clapper | |
| 2008/0018591 A1 | 1/2008 | Pittel et al. | |
| 2009/0327886 A1 | 12/2009 | Whytock et al. | |
| 2010/0085317 A1* | 4/2010 | Park | G06F 1/1626 |
| | | | 345/173 |
| 2010/0127995 A1 | 5/2010 | Rigazio et al. | |
| 2011/0242054 A1 | 10/2011 | Tsu | |
| 2012/0158629 A1* | 6/2012 | Hinckley | G06F 3/038 |
| | | | 706/15 |
| 2012/0182238 A1* | 7/2012 | Lee | G06F 3/0416 |
| | | | 345/173 |
| 2012/0262407 A1 | 10/2012 | Hinckley et al. | |
| 2013/0009907 A1 | 1/2013 | Rosenberg et al. | |
| 2013/0069911 A1* | 3/2013 | You | G06F 3/0416 |
| | | | 345/175 |
| 2013/0077236 A1 | 3/2013 | Becze et al. | |
| 2013/0241890 A1 | 9/2013 | Sharma | |
| 2013/0246861 A1 | 9/2013 | Colley et al. | |
| 2013/0300696 A1 | 11/2013 | Haran et al. | |
| 2013/0319137 A1 | 12/2013 | Grau et al. | |
| 2014/0104225 A1 | 4/2014 | Davidson et al. | |
| 2014/0225857 A1 | 8/2014 | Ma | |
| 2017/0285873 A1* | 10/2017 | Tan | G06F 3/0425 |
| 2017/0357373 A1* | 12/2017 | Kang | G06F 3/0418 |

FOREIGN PATENT DOCUMENTS

| | | |
|---|---|---|
| WO | WO-2009-047759 A2 | 4/2009 |
| WO | WO-2014094699 A1 | 6/2014 |

OTHER PUBLICATIONS

Shahram Izadi et al., "C-Slate: A Multi-Touch and Object Recognition System for Remote Collaboration using Horizontal Surfaces," 2007, pp. 3-10, IEEE.

\* cited by examiner

DETERMINING UNINTENDED TOUCH REJECTION

BACKGROUND

Touch enabled surfaces that detect and recognize user touch have become increasingly available and integrated into computing devices. As such, the ability to detect which touches to a touch-enabled surface are intended and which are unintended is beneficial. By detecting that a touch to a touch-enabled surface is unintended and preventing a computing device from responding to the unintended touch, user experience may be improved.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. In the following discussion and in the claims, the terms "including" and "comprising" are used in an open-ended fashion, and thus should be interpreted to mean "including, but not limited to . . . ." Accordingly, the following detailed description does not limit the disclosed examples. Instead, the proper scope of the disclosed examples may be defined by the appended claims.

A system with touch-sensitive surfaces may facilitate detection of a touch and response, by the system, to the detected touch. By detecting that a touch to a touch-enabled surface is unintended and preventing a computing device from responding to the unintended touch, user experience may be improved.

The system described herein may facilitate an improved determination of whether a touch to a touch-sensitive component of a system is an intended touch. For example, the system may determine whether a touch was intended by comparing how the shape of the touch changes over a set of time intervals (e.g., a set of time intervals from when the touch was first recognized to when the recognition of the touch ended). The system may comprise a plurality of stored sets of spatial features for a respective plurality of touches that were determined to be intended. Each set of spatial features may comprise information related to features of the touch at individual time intervals. The system may revise existing sets of spatial features. Further, the system may revise the plurality of stored sets of spatial features to include new touches that are recognized to be intended. The system may also include customized stored sets of spatial features, which may be customized, for example, based on user, application, touch-sensitive component, environment, and/or other characteristic.

As such, a system for improving unintended touch rejection may recognize a touch on a touch-sensitive surface and capture a set of data related to the touch, where the set of data may comprise, for example, spatial features relating to a shape of the touch over a set of time intervals, and/or other information related to the touch. The system may also determine whether the recognized touch was intended based on a comparison of a first shape of the touch at a first time interval of the set of time intervals and a second shape of the touch at a second time interval of the set of time intervals.

Figure 1:
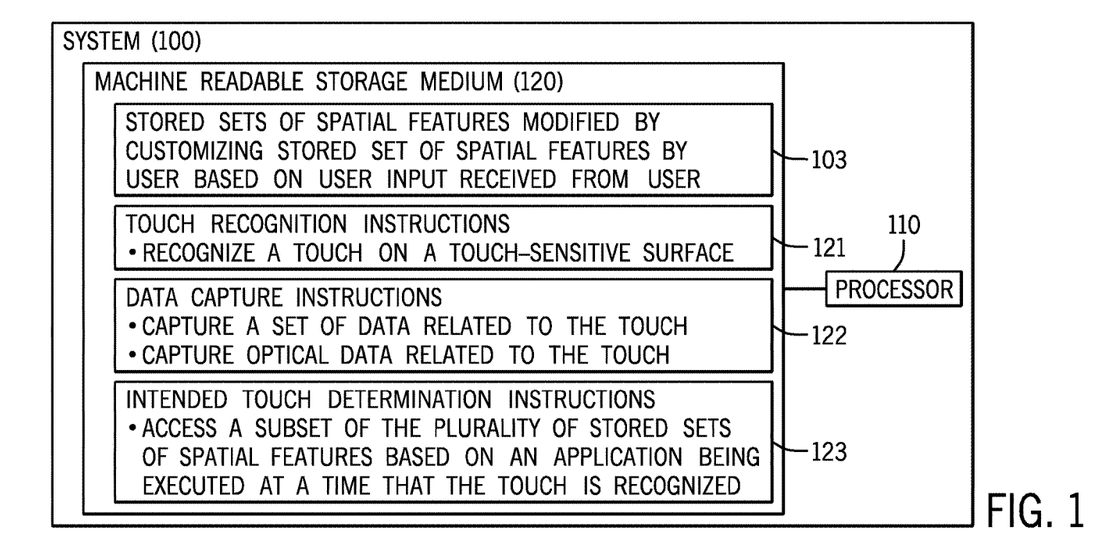
FIG. 1 is a block diagram of an example system for determining unintended touch rejection.

Referring now to the drawings, FIG. 1 is a block diagram of an example system 100 for improving unintended touch rejection on touch-sensitive components of the system 100, System 100 may be a notebook, desktop, tablet, workstation, mobile device, retail point of sale device, smartphone, all-in-one (AiO) computer, gaming device, or any other device suitable for executing the functionality described below. Further, system 100 may comprise at least one touch-sensitive component (e.g., a touch mat, a touch display, and/or other touch-sensitive component). In the example depicted in FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to improve unintended touch rejection on touch-sensitive components, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for improving unintended touch rejection on touch-sensitive components. As detailed below, storage medium 120 may maintain and/or store the data and information described herein.

In some examples, the storage medium 120 may store information related to unintended touch rejection processing performed by the system 100 on touch-sensitive components of the system. For example, the storage medium 120 may store information related to a plurality of stored sets 103 of spatial features. In some examples, the plurality of stored sets 103 of spatial features may initially comprise a standard stored set of spatial features that may later be modified, customized, and/or otherwise improved based on use of the system 100. The initial information related to the standard stored sets 103 of spatial features, and/or the standard stored sets of spatial features may be obtained, for example, from test data, from a third party, and/or in other ways.

In some examples, the information related to an individual stored set of spatial features may also comprise, for example, a user identifier, an application identifier, a touch-sensitive component identifier, an object used to perform the touch, environmental information surrounding the touch-sensitive component, and/or other information that may be included to indicate that the stored set of spatial features may have been customized.

The information related to an individual stored set of spatial features may comprise an identifier of the stored set of spatial features, a set of components that recognized the touch, an amount of time the touch was recognized, a number of time intervals representing the amount of time the touch was recognized, information related to a shape of the touch for each time interval in the number of time intervals, and/or other information related to the stored set of spatial features. The information related to the shape of the touch at a particular time interval may comprise, for example, specifications indicating a size, length, area, circumference, center, and/or other indication of shape of the touch at that time interval. The information related to the shape of the touch may also include, for example, a location of the shape (e.g., a location of a center of the shape, a location at which the touch was first recognized, and/or other location,) on the touch-sensitive component on which it was recognized. In some examples, the amount of time in each time intervals of the set of time intervals may be dependent on the object being used to perform the touch, the touch-sensitive component, the user performing the touch, an application being executed while the touch is being performed, the set of components being used to recognize the touch, and/or other factors related to the touch.

The stored set of spatial features may be determined, as discussed below, for example, from data captured from one or more sensors and/or from the touch-sensitive component at predetermined time intervals of the detected touch (e.g., every 30 ms, and/or other predetermined time interval). The data captured from the sensors may include, for example, optical data, infrared data, acoustic data, and/or other data that comprises information about the touch to the touch-sensitive component. The data captured from the touch-sensitive surface may comprise, for example, information from sensors, pins, haptic materials, and/or other components in the touch-sensitive component that detect interaction with the touch-sensitive surface. The location of the detected touch on the touch-sensitive component may be determined by capturing data from the touch-sensitive component, optical data, acoustic data, infrared data, and/or other data that may be used to determine the location of the detected touch.

In some examples, the set of data to be captured may include a confidence score associated with the recognized touch. The confidence score may be automatically generated and/or made available by the touch-sensitive component. In some examples, a third party manufacturer of the touch-sensitive component may generate a confidence score comprising a number value that indicates a confidence that the touch was intended, responsive to a touch being detected. In some examples, information related to a stored set of spatial features may comprise the confidence score associated with the recognized touch.

As mentioned above, and in some examples, the set of data may comprise temporally differentiated data. The temporally differentiated data may comprise a first subset of data being captured at a first time interval and a second subset of data different from the first subset being captured at a second time interval after the first time interval. As such, the data in the set of data being captured over time for a detected touch may change and may comprise information about the touch at each time interval.

Touch recognition instructions 121, when executed by processor 110, may recognize a touch on a touch-sensitive surface of the system 100. The touch recognition instructions 121, when executed by processor 110, may detect that a touch is recognized by the system 100 responsive to a touch being detected at a touch-sensitive component of the system 100. For example, the system 100 may send a signal and/or otherwise indicate to the processor 120 (and/or the touch recognition instructions 121) that a touch has been detected.

Data capture instructions 122, when executed by processor 110, may capture a set of data related to the recognized touch. The set of data may comprise, for example, a set of spatial features relating to a shape of the touch over a set of time intervals. The set of time intervals may comprise, for example, a set of time intervals from when the touch was recognized to when the touch ended (and/or a subset of the time that the touch was recognized). The data capture instructions 122, when executed by processor 110, may capture the set of data related to the touch from sensors, the touch-sensitive component, and/or other components of the system.

For example, the data capture instructions 122, when executed by processor 110, may capture the set of data from the sensors, which may include, for example, optical data, infrared data, acoustic data, and/or other data related to the touch. The data capture instructions 122, when executed by processor 110, may also capture the set of data from the touch-sensitive surface may comprise, for example, information from sensors, pins, haptic materials, and/or other components in the touch-sensitive component. The data capture instructions 122, when executed by processor 110, may also obtain a context of an application being executed during performance of the touch from the system 100, which may be projecting, displaying, and/or otherwise making accessible for viewing images on the touch-sensitive component. In some examples, data capture instructions 122, when executed by processor 110, may capture data regardless of whether a touch is recognized. For example, the data capture instructions 122, when executed by processor 110, may continually capture data from the sensors, touch-sensitive component, and/or other components of the system 100.

In other examples, the data capture instructions 122, when executed by processor 110, may capture the set of data at predetermined time intervals. The data capture instructions 122, when executed by processor 110, may determine the predetermined time intervals based on information related to a set of components recognizing the touch, a user performing the touch, an object being used to perform the touch, any combination thereof, and/or other factors related to the touch. For example, the data capture instructions 122, when executed by processor 110, may determine and/or obtain from the storage medium 120 an appropriate time interval at which to capture data based on one or more of the factors related to the touch.

Intended touch determination instructions 123, when executed by processor 110, may determine whether the recognized touch was intended. The intended touch determination instructions 123, when executed by processor 110, may determine whether the recognized touch was intended based on the captured set of data related to the recognized touch. For example, the intended touch determination instructions 123, when executed by processor 110, may determine whether the touch was intended based on a comparison of the set of spatial features relating to a shape of the touch at each predetermined time interval of the captured set of data.

To that end, the intended touch determination instructions 123, when executed by processor 110, may make the determination based on a comparison of a first shape (e.g., set of spatial features relating to a shape of the touch) at a first time interval of the set of time intervals and a second shape (e.g., a second set of spatial features relating to a second shape of the touch) at a second time interval of the set of time intervals. For example, the intended touch determination instructions 123, when executed by processor 110, may compare the first set of spatial features relating to a first shape of the touch and the second set of spatial features relating to a second shape of the touch to a corresponding first set of spatial features relating to a first shape of the touch, and second set of spatial features relating to a second shape of the touch at corresponding first and second time intervals of a subset of the plurality of stored sets of spatial features.

In some examples, the intended touch determination instructions 123, when executed by processor 110, may select a subset of the plurality of stored sets of spatial features to compare the captured set of data. A subset of the plurality of stored sets of spatial features may comprise one or a plurality of stored sets of spatial features that have been narrowed from the plurality of stored sets of spatial features based on information related to the recognized touch. The intended touch determination instructions 123, when executed by processor 110, may select the subset based on the touch-sensitive component on which the touch was performed, an object used to perform the touch, a user performing the touch, an application being executed while the touch was being performed, and/or other information related to the recognized touch. In some examples, the intended touch determination instructions 123, when executed by processor 110, may determine the subset based on a speed of movement of the recognized touch, an amount of time that the touch was performed (and/or recognized), and/or other characteristics related to the touch. In some examples, the intended touch determination instructions 123, when executed by processor 110, may select the subset of the stored sets of spatial features by comparing, for each stored set of spatial features, a first predetermined number of shapes of the first predetermined number of time intervals with the captured set of data. Responsive to a threshold amount of the shapes at the corresponding time intervals matching, the stored set of spatial features may be included in the subset of stored sets of spatial features compared with the captured set of data. In some examples, each stored set of spatial features in the subset may be compared with the captured set of data.

The intended touch determination instructions 123, when executed by processor 110, may compare the captured set of data with each stored set of spatial features in the subset. In some examples, the intended touch determination instructions 123, when executed by processor 110, may compare a stored set of spatial features with the captured set of data by comparing, for each time interval in the captured set of data, a shape from the captured set of data and a corresponding shape from the stored set of spatial features. The intended touch determination instructions 123, when executed by processor 110, may determine the recognized touch is intended based on a match between at least one stored set of spatial features and the captured set of data. The intended touch determination instructions 123, when executed by processor 110, may determine that a captured set of data matches a stored set of spatial features based on a threshold number of the shapes matching, based on a difference between the captured set of data and the stored set of spatial features being within a threshold amount, based on a statistically significant correlation between the captured set of data and the stored set of spatial features, based on having no statistical outliers between a shape of the captured set of data and a corresponding shape of the stored set of spatial features, and/or based on other comparison(s) between the captured set of data and the stored set of spatial features.

In some examples, in addition to determining whether the recognized touch is intended based on the captured set of data and each of the stored sets of spatial features in the subset, the intended touch determination instructions 123, when executed by processor 110, may also consider additional data from the captured set of data in determining whether the recognized touch is intended. For example, the intended touch determination instructions 123, when executed by processor 110, may also compare captured infrared data, acoustic data, data captured from sensors, pins, haptic materials, and/or other components in the touch-sensitive component, and/or any other captured data related to the recognized touch. In these examples, each stored set of spatial features in the subset may also comprise information related to acoustic data, infrared data, data from sensors, pins, haptic materials, and/or other types of data that may relate to a touch. The intended touch determination instructions 123, when executed by processor 110, may compare the captured data at each time interval to corresponding data from a stored set of spatial features at a corresponding interval, and may determine whether a touch was intended in a manner similar to that described above.

The intended touch determination instructions 123, when executed by processor 110, may make available to the system information related to the recognized touch responsive to determining that the recognized touch was intended. For example, the intended touch determination instructions 123, when executed by processor 110, may provide the information related to the recognized touch to the processor 120, and/or to other components of the system 100.

In some examples, the intended touch determination instructions 123, when executed by processor 110, may disregard information related to the recognized touch responsive to determining that the recognized touch was not intended. For example, the intended touch determination instructions 123, when executed by processor 110, may not make available the information to the system 100, may delete the captured data from any storage in which it may have been maintained, and/or may otherwise disregard the information related to the recognized touch.

Figure 2:
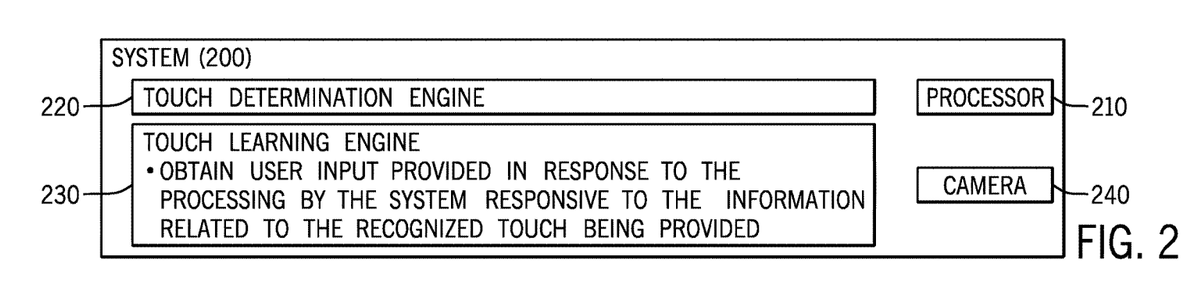
FIG. 2 is a block diagram of an example system for determining unintended touch rejection.

FIG. 2 is a block diagram of an example system 200 for improving unintended touch rejection on touch-sensitive components of the system 200. As with system 100, system 200 may be a notebook, desktop, tablet, workstation, mobile device, retail point of sale device, smartphone, all-in-one (AiO) computer, gaming device, or any other device suitable for executing the functionality described below. As with system 100, system 200 may comprise at least one touch-sensitive component (e.g., a touch mat, a touch display, and/or other touch-sensitive component). As with processor 110 of FIG. 1, processor 220 may be one or more CPUs, microprocessors, and/or other hardware devices suitable for retrieval and execution of instructions. System 200 may also comprise a non-transitory machine-readable storage medium that includes information related to the set of modes as described above with non-transitory machine-readable storage medium 120.

As detailed below, system 200 may include a series of engines 220-230 for improving unintended touch rejection on touch-sensitive components. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Touch determination engine 220 may determine whether the recognized touch was intended. For example, touch determination engine 220 may determine whether the recognized touch was intended by accessing a plurality of stored sets of spatial features and comparing a captured set of spatial features to at least one set of the stored set of spatial features. The captured set of spatial features may comprise, for example, a set of spatial features captured from the system 200 that relate to a shape of the recognized touch collected over a respective set of time intervals. The touch determination engine 220 may then determine whether the recognized touch was intended based on the comparison. In some examples, touch determination engine 220 may determine whether the recognized touch was intended further based on a confidence score associated with the recognized touch.

Touch determination engine 220 may also make available to the system information related to the recognized touch responsive to determining that the recognized touch was intended. In some examples, touch determination engine 220 may disregard information related to the recognized touch responsive to determining that the recognized touch was not intended.

Touch determination engine 220 may also obtain information from a camera (e.g., camera 240) and/or other sensors of the system 200 (which may include sensors, cameras, and/or other components to recognize a touch and obtain data related to a touch as system 100). Touch determination engine 220 may determine whether the recognized touch was intended by correlating the set of data from the recognized touch with recorded data from the camera 240.

In some examples, the touch determination engine 220 may perform this functionality in a manner the same as or similar to that of the data capture instructions 122, intended touch determination instructions 123, and/or other instructions of computing device 100. Further details regarding an example implementation of touch determination engine 220 are provided above in connection with data capture instructions 122, intended touch determination instructions 123, and/or other instructions of FIG. 1.

Touch learning engine 230 may modify the plurality of stored sets of spatial features based on user interaction with touch-sensitive components of the system 100. The touch learning engine 230 may modify the stored sets of spatial features using a machine-learning framework, such as SVM, AdaBoost, CNN, and/or other machine learning frameworks. The touch learning engine 230 may modify the stored sets of spatial features to customize the stored sets of spatial features for a user, application, object used to perform the touch, touch-sensitive component on which the touch is performed, environment in which the system 200 resides, any combination thereof, and/or other factors involved in the touch.

The touch learning engine 230 may modify the stored sets of spatial features based on input from a user from whom the touch was recognized. For example, the touch learning engine 230 may modify the plurality of stored sets of spatial features by customizing the stored sets of spatial features for a user based on input received from the user. The touch learning engine 230 may prompt a user to enter input that correspond to intended touches by the user. The touch learning engine 230 may then store information related to a shape of the touch over time and/or other information related to the touch as a set of stored spatial features in the storage medium 120.

For example, the touch learning engine 230 may prompt the user to type a predetermined text and may store information related to the set of spatial features gleaned from the touch recognized during the user's typing as an intended touch. In another example, the touch learning engine 230 may prompt the user to draw a picture and/or modify a displayed picture and may obtain information related to the set of spatial features gleaned from the touch recognized during the user's movement. The touch learning engine 230 may prompt the user to interact with a touch-sensitive component of the system 100 in other ways as well. In some examples, the touch learning engine 230 may query the user as to a portion of the recognized touch and may modify the information related to the set of spatial features based on the user's response. The touch learning engine 230 may also capture outliers and/or extra information to modify the stored sets of spatial features for the user.

The touch learning engine 230 may also obtain user input responsive to processing done by the system and may revise a stored set of spatial features based on that obtained user input. For example, the system 100 may perform processing responsive to what the system determined to be an intended touch by the user. The user may perform an action in response to the processing that indicates that the processing should not have occurred and that the touch was actually not intended. The touch learning engine 230 may modify the stored set of spatial features which was used by the touch determination engine 220 to determine that the recognized touch was intended to try to preclude an identical touch from being considered intended in the future.

The touch learning engine 230 may also modify the stored sets of spatial features based on environmental conditions surrounding the system 200, an age of the touch-sensitive component, and/or other factors external to a user's interaction with the system 200. For example, the touch learning engine 230 may modify the stored sets of spatial features based on ambient temperature surrounding the system 200, average humidity measurements surrounding the system 200, and/or other environmental conditions surrounding the system 200. The touch reaming engine 230 may also modify the stored sets of spatial features based on an age of a touch-sensitive component. For example, as the touch-sensitive component continues to be used, it may be less responsive than a new touch-sensitive component because of wear and tear to electrical circuits in the touch-sensitive component. In some examples, the touch learning engine 230 may also modify the stored sets of spatial features based on infrared data, acoustic data, data captured from sensors, pins, haptic materials, and/or other components in the touch-sensitive component, and/or any other captured data related to the recognized touch. The touch learning engine 230 may modify the stored sets of spatial features based on other factors as well, both relevant and external to the user's interaction with the system 200.

Figure 3:
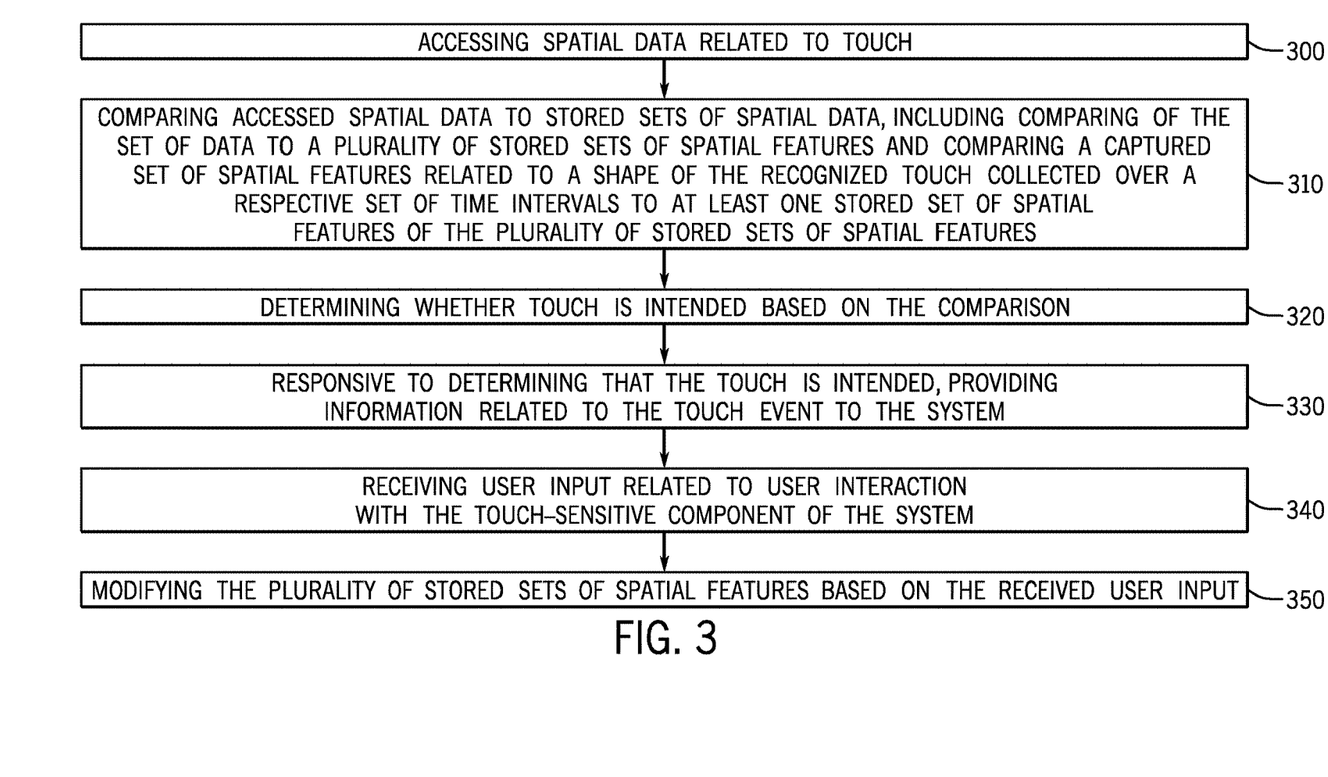
FIG. 3 is a flowchart of an example method for execution by a system for determining unintended touch rejection.

FIG. 3 is a flowchart of an example method for execution by a system for improving unintended touch rejection of a touch-sensitive component.

Although execution of the method described below is with reference to system 100 of FIG. 1, other suitable devices for execution of this method will be apparent to those of skill in the art (e.g., system 200 of FIG. 2, and/or other devices). The method described in FIG. 3 and other figures may be implemented in the form of executable instructions stored on a machine-readable storage medium, such as storage medium 120, by one or more engines described herein, and/or in the form of electronic circuitry.

In an operation 300, spatial data related to a touch recognized on a touch-sensitive component of the system may be accessed, wherein the spatial data comprises a set of shapes recognized in the touch over a respective set of time intervals. For example, the system 100 (and/or the touch recognition instructions 121, touch determination engine 220, and/or other resource of the system 100) may access the spatial data. The system 100 may access the spatial data in a manner similar or the same as that described above in relation to the execution of the touch recognition instructions 121, touch determination engine 220, and/or other resource of the system 100.

In an operation 310, the accessed spatial data may be compared to a plurality of stored sets of spatial features. For example, the system 100 (and/or the data capture instructions 122, touch determination engine 220, or other resource of the system 100) may compare the data. The system 100 may compare the data in a manner similar or the same as that described above in relation to the execution of the data capture instructions 122, touch determination engine 220, and/or other resource of the system 100.

In an operation 320, a determination may be made as to whether the touch is intended based on the comparison. For example, the system 100 (and/or the intended touch determination instructions 122, touch determination engine 220, or other resource of the system 100) may determine whether the touch is intended. The system 100 may determine whether the touch is intended in a manner similar or the same as that described above in relation to the execution of the intended touch determination instructions 122, touch determination engine 220, and/or other resource of the system 100.

In an operation 330, information related to the touch may be provided to the system responsive to determining that the touch is intended. For example, the system 100 (and/or the intended touch determination instructions 122, touch determination engine 220, or other resource of the system 100) may provide the information. The system 100 may provide the information in a manner similar or the same as that described above in relation to the execution of the intended touch determination instructions 122, touch determination engine 220, or other resource of the system 100.

In an operation 340, user input related to user interaction with the touch-sensitive component of the system may be received. In some examples, the user interaction may comprise user interaction in response to processing occurring in the system responsive to the information related to the touch being provided (e.g., by operation 330). For example, the system 100 (and/or the intended touch determination instructions 122, touch learning engine 220, touch learning engine 230, or other resource of the system 100) may receive the user input. The system 100 may receive the user input in a manner similar or the same as that described above in relation to the execution of the intended touch determination instructions 122, touch determination engine 220, touch learning engine 230, and/or other resource of the system 100.

Figure 3A:
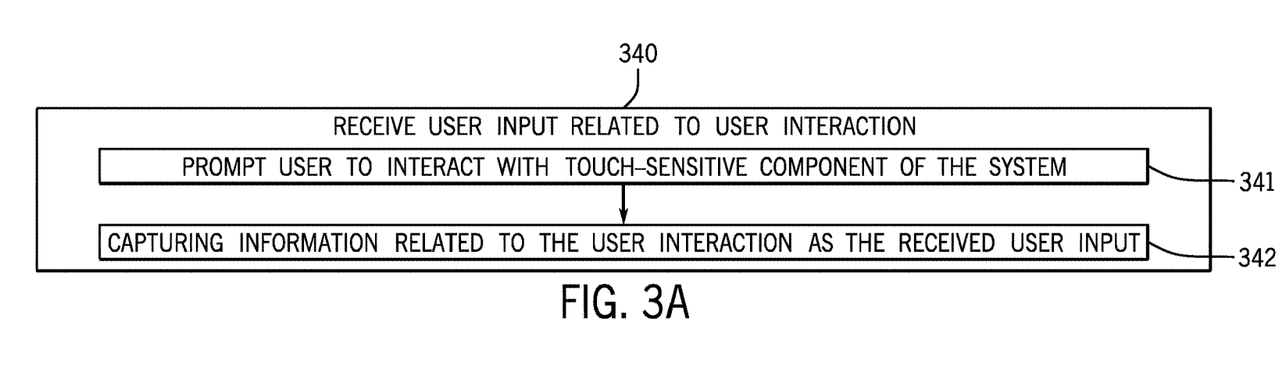
FIG. 3A is a flowchart of an example method for execution by a system for determining unintended touch rejection.

In some examples, operation 340 may be performed in various manners. FIG. 3A is a flowchart of an example method for execution by a system for receiving user input related to the user interaction.

In some examples, and as illustrated in FIG. 3A, in an operation 341, the user may be prompted to interact with the touch-sensitive component of the system. For example, the system 100 (and/or the intended touch determination instructions 122, touch determination engine 220, touch learning engine 230, or other resource of the system 100) may prompt the user. The system 100 may prompt the user in a manner similar or the same as that described above in relation to the execution of the intended touch determination instructions 122, touch determination engine 220, touch learning engine 230, and/or other resource of the system 100.

In an operation 342, information related to the user interaction with the touch-sensitive component of the system may be captured as the received user input. For example, the system 100 (and/or the intended touch determination instructions 122, touch determination engine 220, touch learning engine 230, or other resource of the system 100) may capture information related to the user interaction as the received user input. The system 100 may capture information related to the user interaction as the received user input in a manner similar or the same as that described above in relation to the execution of the intended touch determination instructions 122, touch determination engine 220, touch learning engine 230, and/or other resource of the system 100.

Returning to FIG. 3, in an operation 350, the plurality of stored sets of spatial features may be modified based on the received user input. For example, the system 100 (and/or the touch learning engine 230, or other resource of the system 100) may modify the plurality of stored sets of data. The system 100 may modify the plurality of stored sets of data in a manner similar or the same as that described above in relation to the execution of the touch learning engine 230, and/or other resource of the system 100.

Figure 3B:
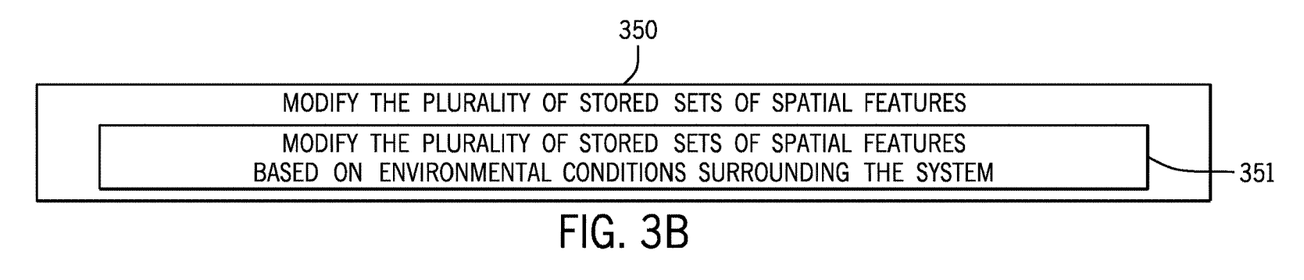
FIG. 3B is a flowchart of an example method for execution by a system or determining unintended touch rejection.

In some examples, operation 350 may be performed in various manners. FIG. 3B is a flowchart of an example method for execution by a system for modifying the plurality of stored sets of spatial features.

In some examples, and as illustrated in FIG. 3B, in an operation 351, the plurality of stored sets of spatial features may be modified based on environmental conditions surrounding the system. For example, the system 100 (and/or the touch learning engine 230, or other resource of the system 100) may modify the plurality of stored sets of data. The system 100 may modify the plurality of stored sets of data in a manner similar or the same as that described above in relation to the execution of the touch learning engine 230, and/or other resource of the system 100.

The foregoing disclosure describes a number of examples for determining unintended touch rejection. The disclosed examples may include systems, devices, computer-readable storage media, and methods for determining unintended touch rejection. For purposes of explanation, certain examples are described with reference to the components illustrated in FIGS. 1-3B. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-3B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

I claim:

1. A non-transitory machine-readable storage medium comprising instructions for determining unintended touch rejection, the instructions executable by a processor of a system to:
   recognize a touch on a touch-sensitive surface;
   capture a set of data related to the touch, wherein the set of data comprises a set of spatial features relating to a set of shapes of the touch over a set of time intervals; and
   determine whether the recognized touch was intended based on a comparison of shapes of the set of shapes of the touch to at least one stored set of spatial features of a plurality of stored sets of spatial features.

2. The storage medium of claim 1, wherein the set of time intervals comprise a plurality of time intervals from an initial recognition of the touch to an end of recognition of the touch.

3. The storage medium of claim 1, wherein each of the plurality of stored sets of spatial features corresponds to a respective intended touch.

4. The storage medium of claim 1, wherein the plurality of stored sets of spatial features comprise a customized set of spatial features for a user that provided the touch, wherein the customized set of spatial features for the user is customized based on input from the user.

5. The storage medium of claim 1, further comprising instructions executable by the processor of the system to:
   access a subset of the plurality of stored sets of spatial features based on an application being executed at a time that the touch is recognized.

6. A system for determining unintended touch rejection, the system comprising:
   a touch determination engine to:
      determine whether a recognized touch was intended by:
         accessing a plurality of stored sets of spatial features;
         comparing a captured set of spatial features related to a shape of the recognized touch collected over a respective set of time intervals to at least one stored set of spatial features of the plurality of stored sets of spatial features; and
         determining whether the recognized touch was intended based on the comparison; and
      a touch learning engine to:
         modify the plurality of stored sets of spatial features based on input from a user from whom the touch was recognized.

7. The system of claim 6, wherein the touch learning engine:
   modifies the plurality of stored sets of spatial features by customizing the stored set of spatial features for the user based on user input received from the user.

8. The system of claim 6, wherein the touch determination engine provides information related to the recognized touch to the system, and
   wherein the touch learning engine modifies the plurality of stored sets of spatial features by:
      obtaining user input provided in response to processing by the system responsive to the information related to the recognized touch being provided; and
      modifying at least one stored set of spatial features of the plurality of stored sets of spatial features based on the obtained user input.

9. The system of claim 6, further comprising:
   a camera that records optical data related to the touch,
   wherein the touch determination engine determines whether the recognized touch was intended by correlating the data corresponding to the captured set of spatial features with the recorded optical data from the camera.

10. A method for execution by a set of physical processors implementing machine-readable instructions for determining unintended touch rejection, the method comprising:
    accessing spatial data related to a touch recognized on a touch-sensitive component of the system, wherein the spatial data comprises a set of shapes recognized in the touch over a respective set of time intervals;
    comparing the accessed spatial data to a plurality of stored sets of spatial features;
    determining whether the touch is intended based on the comparison;
    responsive to determining that the touch is intended, providing information related to the touch to the system;
    receiving user input related to user interaction with the touch-sensitive component of the system; and
    modifying the plurality of stored sets of spatial features based on the received user input.

11. The method of claim 10 wherein the user interaction comprises user interaction in response to processing occurring in the system responsive to information related to the touch being provided.

12. The method of claim 10, wherein receiving the user input comprises:
    prompting the user to interact with the touch-sensitive component of the system; capturing information related to the user interaction with the touch-sensitive component of the system as the received user input.

13. The method of claim 10, further comprising:
    modifying the plurality of stored sets of spatial features based on environmental conditions surrounding the system.

* * * * *